United States Patent [19]
Seyferth et al.

[11] Patent Number: 5,171,736
[45] Date of Patent: Dec. 15, 1992

[54] PRECERAMIC ORGANOSILICON-BORON POLYMERS

[75] Inventors: Dietmar Seyferth, Lexington, Mass.; Herbert Plenio, Herzberg/Harz, Fed. Rep. of Germany

[73] Assignee: Massachusetts Institute of Technology, Cambridge, Mass.

[21] Appl. No.: 421,586

[22] Filed: Oct. 16, 1989

[51] Int. Cl.[5] .................. C04B 35/56; C04B 35/58
[52] U.S. Cl. .......................................... 501/96; 528/4; 528/13; 264/65
[58] Field of Search ............... 501/92, 96, 90; 528/4, 528/13; 264/65

[56] References Cited

U.S. PATENT DOCUMENTS

| | | | |
|---|---|---|---|
| 3,108,985 | 10/1963 | Wever et al. | 260/37 |
| 3,853,567 | 12/1974 | Verbeck et al. | 106/44 |
| 3,892,583 | 7/1975 | Winter et al. | 106/55 |
| 4,310,651 | 1/1982 | Baney et al. | 528/21 |
| 4,312,970 | 1/1982 | Gaul | 526/279 |
| 4,404,153 | 9/1983 | Gaul | 264/29.2 |
| 4,482,669 | 11/1984 | Seyferth et al. | 528/442 |
| 4,611,035 | 9/1986 | Brown et al. | 525/474 |
| 4,639,501 | 1/1987 | Seyferth et al. | 528/15 |
| 4,645,807 | 2/1987 | Seyferth et al. | 525/474 |
| 4,650,837 | 3/1987 | Seyferth et al. | 525/478 |
| 4,705,837 | 11/1987 | Seyferth et al. | 528/31 |
| 4,719,273 | 1/1988 | Seyferth et al. | 528/15 |
| 4,720,532 | 1/1988 | Seyferth et al. | 528/28 |
| 4,730,026 | 3/1988 | Bolt et al. | 525/475 |
| 4,767,876 | 8/1988 | Seyferth et al. | 556/410 |
| 4,780,337 | 10/1988 | Seyferth et al. | 427/387 |

FOREIGN PATENT DOCUMENTS

| | | |
|---|---|---|
| 0266860 | 6/1987 | European Pat. Off. . |
| 0262914 | 9/1987 | European Pat. Off. . |
| 0389084 | 1/1990 | European Pat. Off. . |
| 0404503 | 6/1990 | European Pat. Off. . |

OTHER PUBLICATIONS

Penn et al., J. Appl. Polymer Sci. 27: 3751–3761 (1982).
R. Thompson, "Ther Chemistry of Metal Borides and Related Compounds", in Progress in Boron Chemistry, vol. 2, R. J. Brotherton and H. Steinberg, ed., Pergamon, London, 1970, pp. 173–230.
Dietmar Seyferth et al., Journ. of Am. Ceramic Soc., 73 (1990) Jul., No. 7.
William M. Scantlin et al., Inorganic Chem. vol. 11, No. 12, 1972.

*Primary Examiner*—William R. Dixon, Jr.
*Assistant Examiner*—Alan Wright
*Attorney, Agent, or Firm*—George W. Neuner; Ronald I. Eisenstein

[57] ABSTRACT

Preceramic polymers are prepared by mixing an organosilicon oligomer or polymer containing a multiplicity of Si—H and/or Si—N functional groups with a borane in an organic solvent for a sufficient time for the reactants to react, wherein the molar ratio of the organosilicon polymer repeat unit to borane is 15 or less.

40 Claims, 14 Drawing Sheets

PRECERAMIC ORGANOSILICON-BORON POLYMERS

The U.S. government has rights in this invention pursuant to Grant No. AF-AFOSR-89-0040 awarded by the Department of Defense (Air Force Office of Scientific Research, AFSC).

This invention is directed to using organosilicon polymers having a plurality of Si—H and/or Si—N functional groups, preferably organopolysilazanes, and boranes to form organosilicon-boron polymeric precursors whose pyrolysis will result in borosilicon ceramics, preferably borosilicon nitride ceramics.

In recent years there has been a great deal of interest in preceramic polymeric materials which can serve as precursors, via their pryolysis, for silicon-containing ceramics. R. W. Rice, Amer. Ceram. Soc. Bull. 62:889-892 (1983). Uses for such polymers include among others: formation into complex shapes and subsequent pyrolysis to give a ceramic material of the same shape; spinning into continuous fibers whose subsequent pyrolysis yields ceramic fibers; as a matrix material for carbon or ceramic fibers, or as a binder for ceramic powders (with subsequent pyrolysis to form a ceramic body); oxidation-resistant coating on otherwise oxidizable materials (such as carbon-carbon composites), after the polymer coating is made it can be pyrolyzed to give the resistant ceramic coating; infiltration of porous ceramic bodies such as ones obtained from reaction-sintered silicon nitride by the polymer itself (if liquid) or by a solution of the polymer with subsequent pyrolysis to form a ceramic resulting in better strength, oxidation resistance, etc. of the body; and formation of thin films of ceramic material for electronics applications. For example, Penn, et al., J. Appl. Polymer Sci., 27:3751-61 (1982) describe the preparation of silicon carbide-silicon nitride fibers from a polysilazane precursor. Other polymer precursors for forming silicon carbide and silicon nitride ceramics have been described in U.S. Pat. Nos. 3,108,985; 3,853,567; 3,892,583; 4,310,651, 4,312,970, 4,404,153 and 4,611,035. These linear or cross-linked polymers and processes for producing ceramic materials generally have been found to be deficient in one or more ways. For example, if the preceramic polymer is to be used in the fabrication of ceramic fibers or ceramic coatings or as a binder for ceramic powders or as a matrix in ceramic composites it should be fusible and/or soluble in an organic solvent. For the preparation of shaped ceramic bodies or ceramic powders, the material need not be soluble or fusible. However, whatever the application may be, its pyrolysis should result in the evolution of as small an amount of volatiles as possible and leave behind a ceramic residue in as high a yield as possible.

Seyferth et al., in U.S. Pat. Nos. 4,650,837, 4,645,807, 4,639,501, 4,780,337, 4,767,876, 4,720,532, 4,705,837, 4,719,273, 4,820,738, and 4,482,669 have disclosed new polymers whose pyrolysis results in good ceramic yields. However, there are many other organosilicon polymers that one might hope would be useful as preceramic materials, but whose pyrolysis does not result in the evolution of as small amounts of volatiles as possible.

There has also been interest in boron-containing ceramic materials, boron carbide, $B_4C$, boron nitride, BN, boron phosphides, BP, $B_{12}P_2$, and $B_{13}P_2$, aluminum boride, $AlB_{12}$, boron silicides. $B_4Si$, $B_6Si$ and $B_{12}Si$, and the transition metal borides because of their outstanding chemical and/or physical properties (See R. Thompson, "The Chemistry of Metal Borides and Related Compounds", in "Progress in Boron Chemistry", vol. 2, R. J. Brotherton and H. Steinberg, ed., Pergamon, London, 1970, pp. 173-230; A. Meller in "Gmelin Handbuch der Anorganischen Chemie", "Boron Compounds", 1st supplement, vol. 2: "Boron and Nitrogen, Halogens" (German); K. Niedenzu and K. C. Buschbeck, ed. Springer-Verlag, Berlin, 1989, pp. 1-69). Boron nitride has high thermal stability (mp 2730° C.), excellent high temperature strength, superior thermal shock resistance and is chemically inert and resistant to molten metals. Furthermore, it is a high resistance electrical insulator and it exhibits high thermal conductivity.

$BN/Si_3N_4$ blends are of interest. They have been prepared by chemical vapor deposition using $SiCl_4/B_2H_6/NH_3/H_2$ (Hirai, T., et al., in "Emergent Process Methods For High-Technology Ceramics", Materials Science Research, vol. 17, Davis, R. F., et al., eds., Plenum, N.Y., 1984, pp. 347-358) and $SiH_4/B_2H_6/N_2$ (Nakahigashi, T., et al., Shinku, 31:789 (1980); Chem. Abstr. 110 81199m) as source gases. The fracture toughness of the deposited thin films improved dramatically at Si contents greater than 10 atom percent while their hardness gradually decreased as the Si content increased from 0 to 48 atom percent.

Mazdiyasni and Ruh (J. Am. Ceram. Soc., 64:415 (1981)) fabricated high-density $Si_3N_4(+6\% \ CeO_2)$ composites with 5 to 50 percent BN by hot pressing. These composites were found to have better thermal shock resistance than a sample of commercial hot pressed $Si_3N_4$. In another method $Si_3N_4$ powder was treated at high temperatures with a gas containing $BCl_3$ and $NH_3$ to give $BN/Si_3N_4$ blends that could be used to make ceramic parts having high relative density and bending strength (Nakamura Y., et al., Jpn. Kokai JP 01 83,500 (89 83,506) and JP 01 83,507 (89 83,507) (Mar. 29, 1989), Chem. Abstr. 111:44274 g and 44275 h (1989)).

It would be useful to have a polymer precursor for such silicon nitride/boron nitride blends that can be readily formed and is stable at room temperature. Additionally, it, preferably, should be a processible precursor, i.e., one that is soluble in organic solvents and/or fusible. Furthermore, the ceramic precursor should give a high yield (greater than 60%) of ceramic residue on pyrolysis. High ceramic yields minimize both shrinkage on pyrolysis and the destructive effect of evolved volatiles on the ceramic microstructure. It would also be useful to have a preceramic organosilicon-boron polymer that can be formed using readily available compounds.

Such preceramic polymers can, under appropriate conditions, give a ceramic material that would be useful: (1) in the preparation of ceramic fibers; (2) in the preparation of ceramic coatings, particularly on otherwise oxidizable materials and as a passivation barrier between ceramic interfaces; (3) as binders for fabricating shaped articles from ceramic powders, (e.g., $Si_3N_4$, BN, SiC, etc.); (4) as a sintering aid; and (5) in forming into shaped bodies whose subsequent pyrolysis gives a ceramic material of the same shape.

SUMMARY OF THE INVENTION

We have now discovered an organosilicon-boron preceramic polymer prepared by reacting an organosilicon oligomer or polymer having a plurality of Si—H or Si—N functional groups with a borane wherein the molar ratio of organosilicon polymer repeat unit to borane is 15 or less, more preferably 10 or less.

The organosilicon oligomer or polymer is preferably an oligosilazane or polysilazane having a plurality of Si—H and/or Si—N functional groups. More preferably, it is a oligosilazane of the type $[R^1R^2SiNR^3]_n$, wherein $R^1$, $R^2$, and $R^3$ are H or an organic substituent and $R^1$, $R^2$ and $R^3$ may all be the same or different, and n is greater than 1. Preferably, the organic group is a lower alkyl group having from 1 to about 8 carbon atoms, a substituted or unsubstituted cycloalkyl group having from 3 to about 8 carbon atoms, a substituted or unsubstituted alkenyl group having from 2 to about 8 carbon atoms, or a substituted or unsubstituted lower aryl group having from 6 to about 10 carbon atoms. The substituents can be a lower alkyl group or a heteroatom (e.g., O, N, S, etc.). The borane can be one with 3, 2 or 1H substituents per B. However, a $H_3B$. Lewis base complex, diborane, $B_2H_6$, a $RBH_2$. Lewis base complex, an alkylborane, $R_2B_2H_4$, wherein R is an alkyl group, a $R^1R^2NBH_2$. Lewis base complex, wherein $R^1$ and $R^2$ are defined the same as above, and an uncomplexed aminoborane are preferred. The borane is more preferably a $H_3B$. Lewis base complex. For example, $H_3B\cdot S(CH_3)_2$; $H_3B\cdot N(C_2H_5)_3$, $H_3B\cdot C_5H_5N$, $H_3B\cdot S(C_2H_5)_2$, $H_3B\cdot P(CH_3)_3$, $H_3B\cdot AsPh_3$,

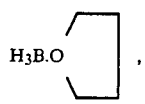

$H_3B\cdot O(CH_3)_2$, $H_3B\cdot N\equiv CCH_3$, and the like.

DETAILED DESCRIPTION OF THE INVENTION

Figure 1:
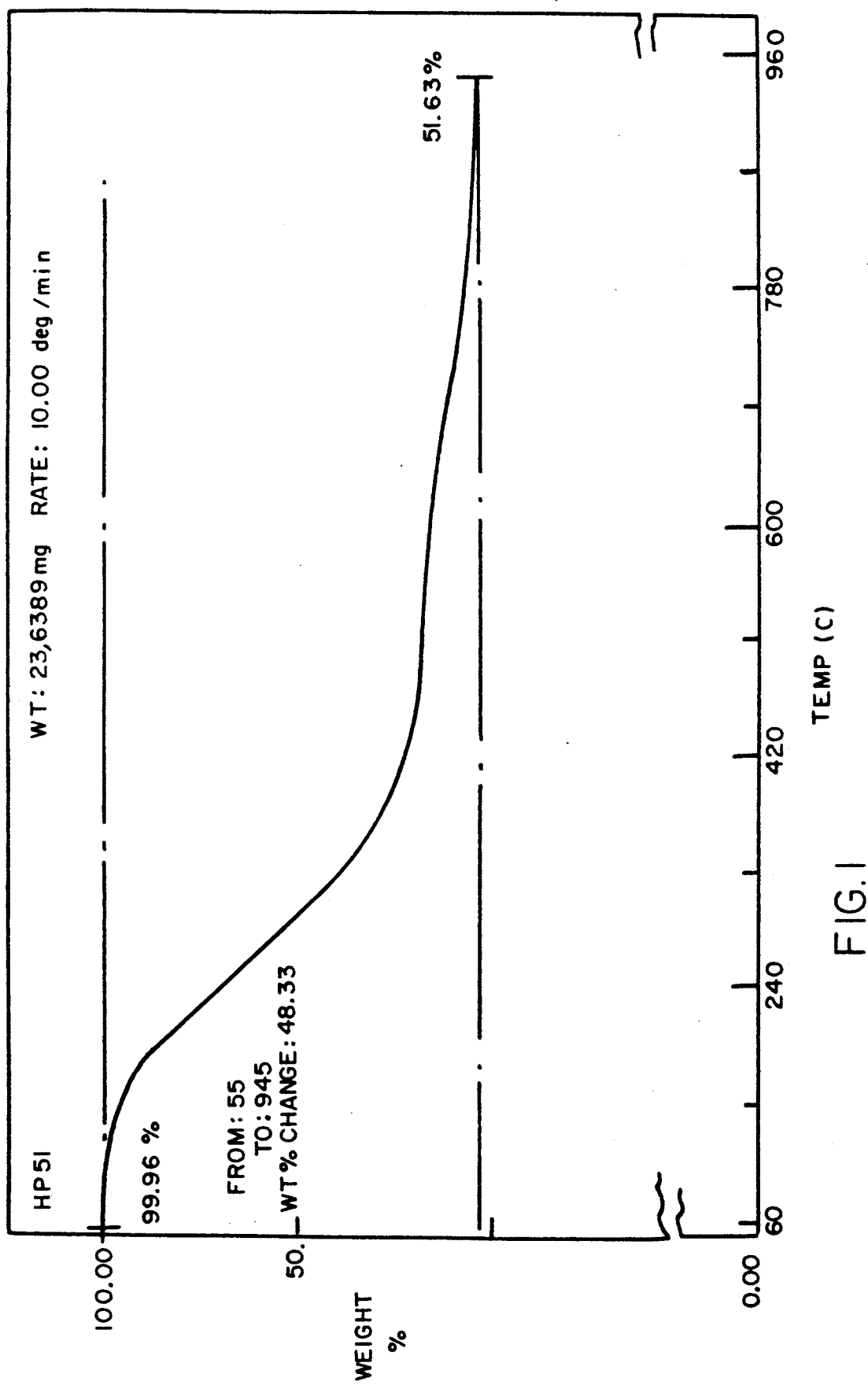
FIG. 1 shows a TGA trace of the products of Example 1.
Figure 2:
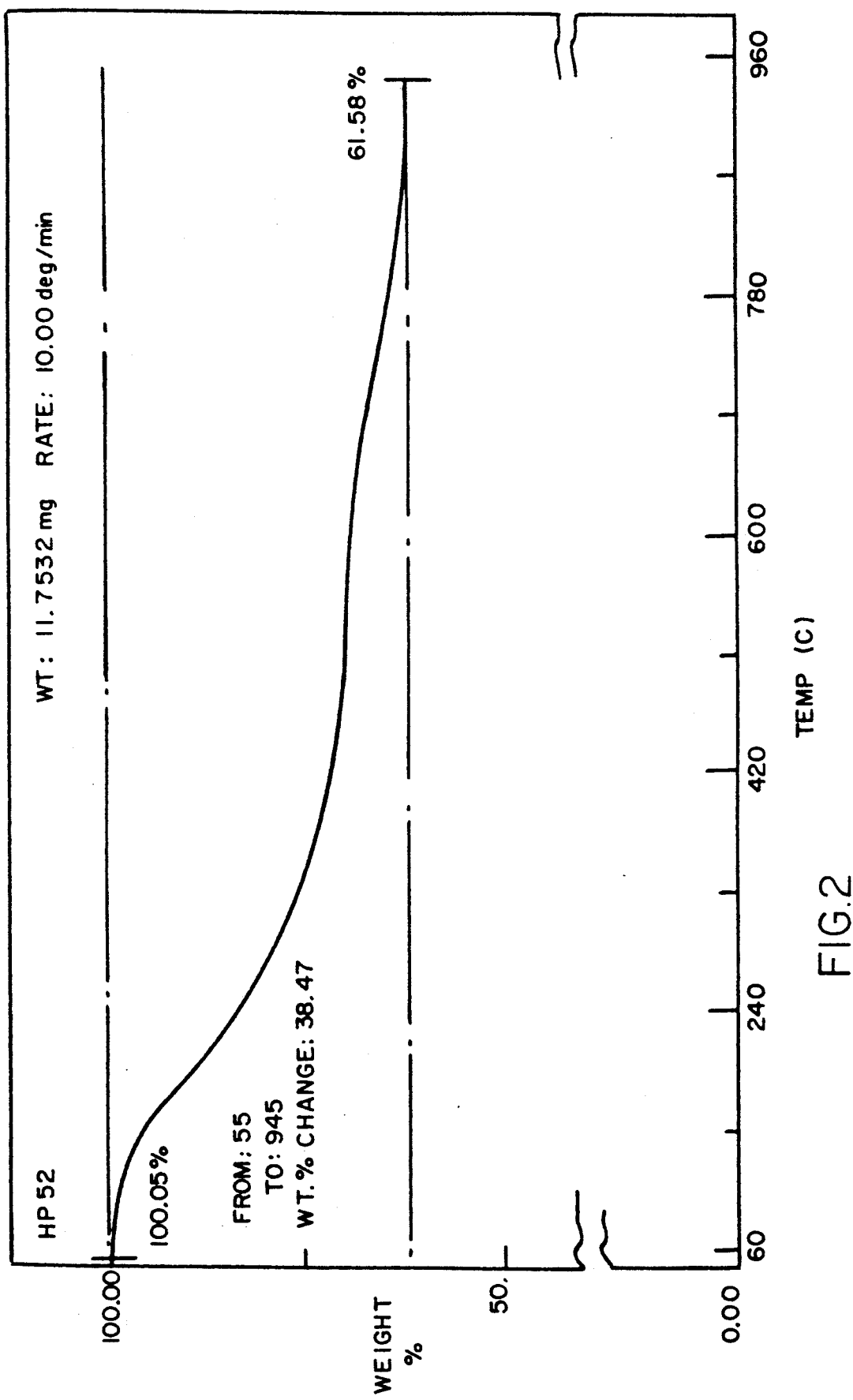
FIG. 2 shows a TGA trace of the products of Example 2.
Figure 3:
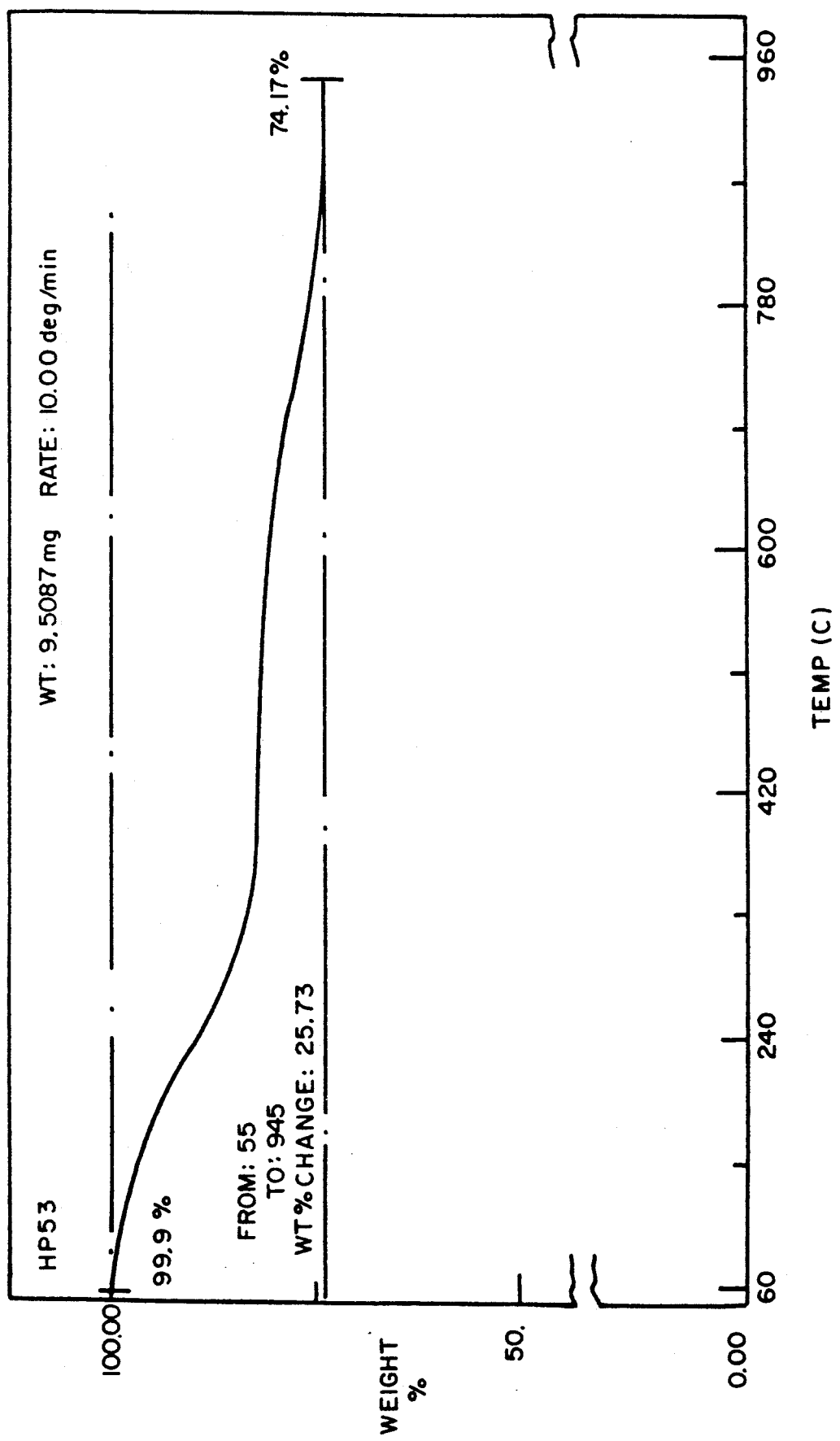
FIG. 3 shows a TGA trace of the products of Example 3.
Figure 4:
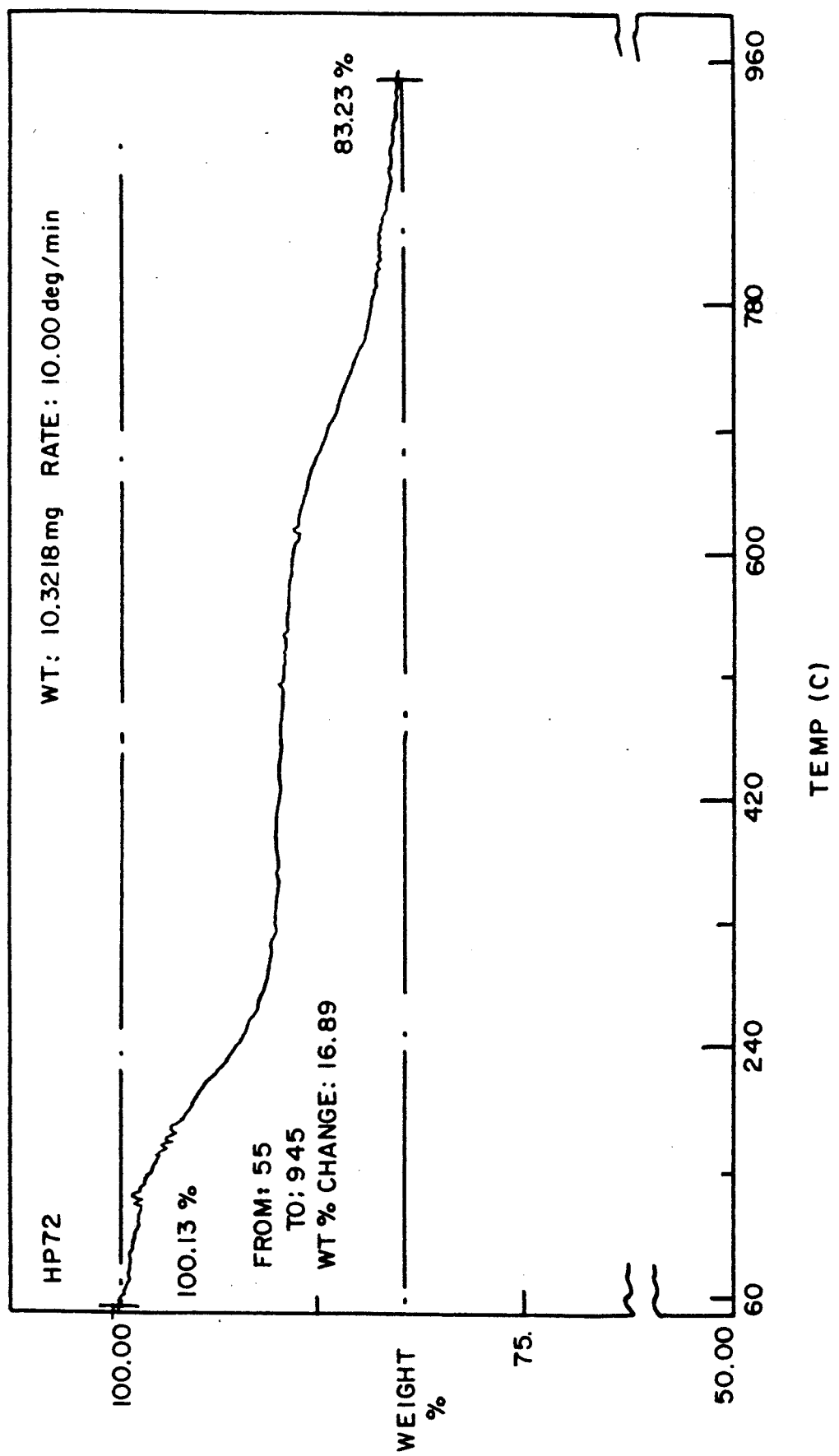
FIG. 4 shows a TGA trace of the products of Example 4.
Figure 5:
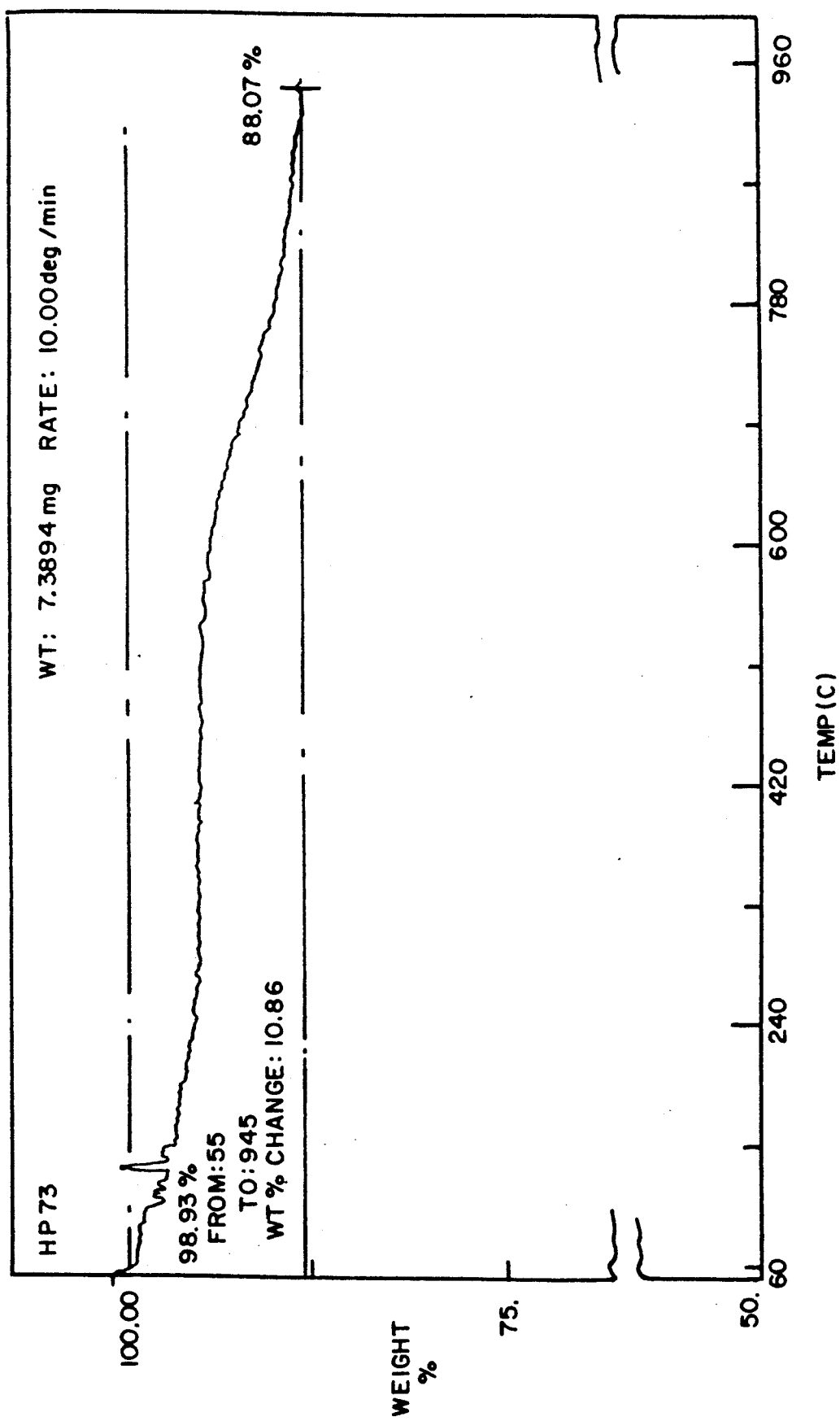
FIG. 5 shows a TGA trace of the products of Example 5.
Figure 6:
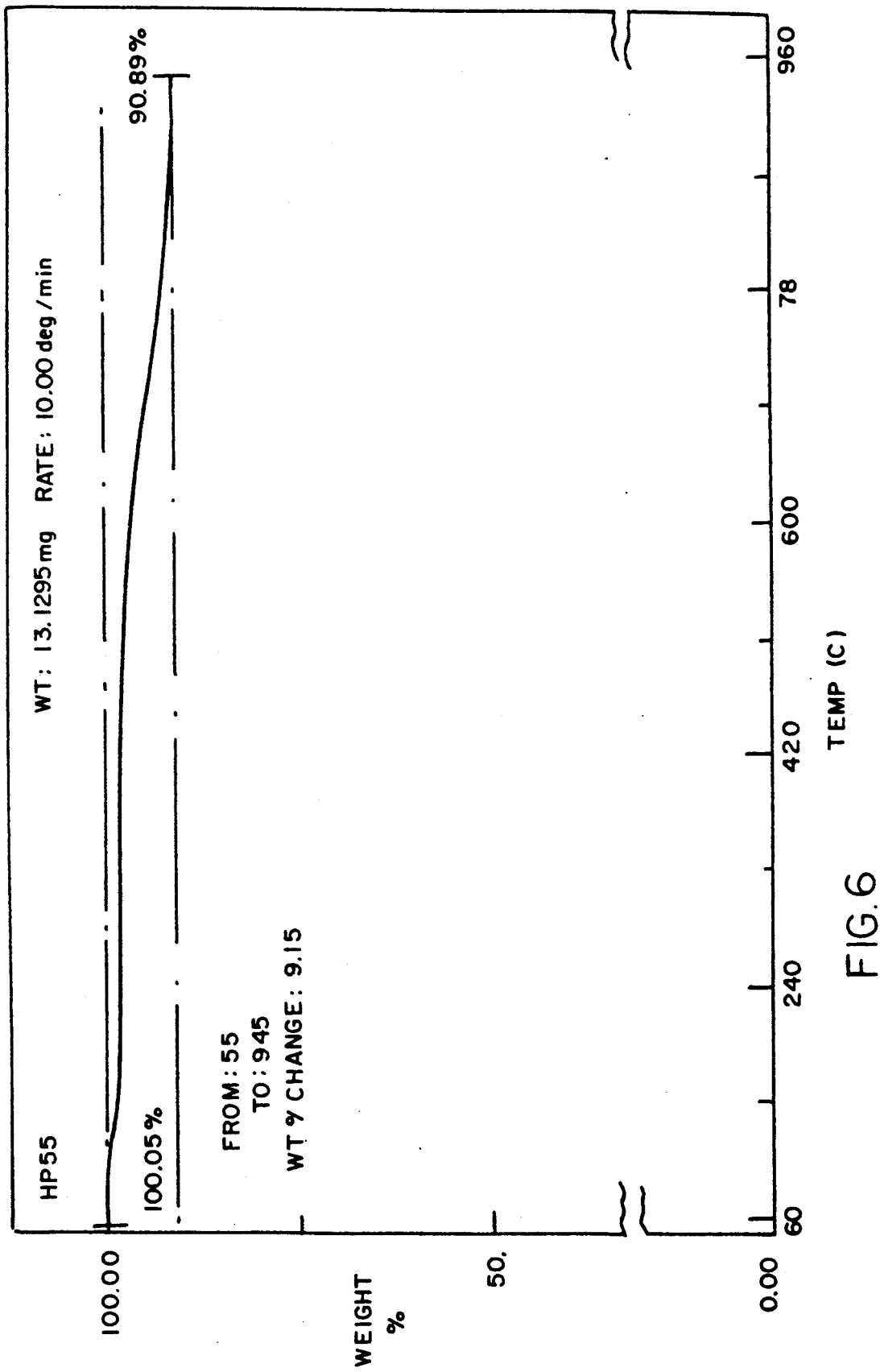
FIG. 6 shows a TGA trace of the products of Example 6.
Figure 7:
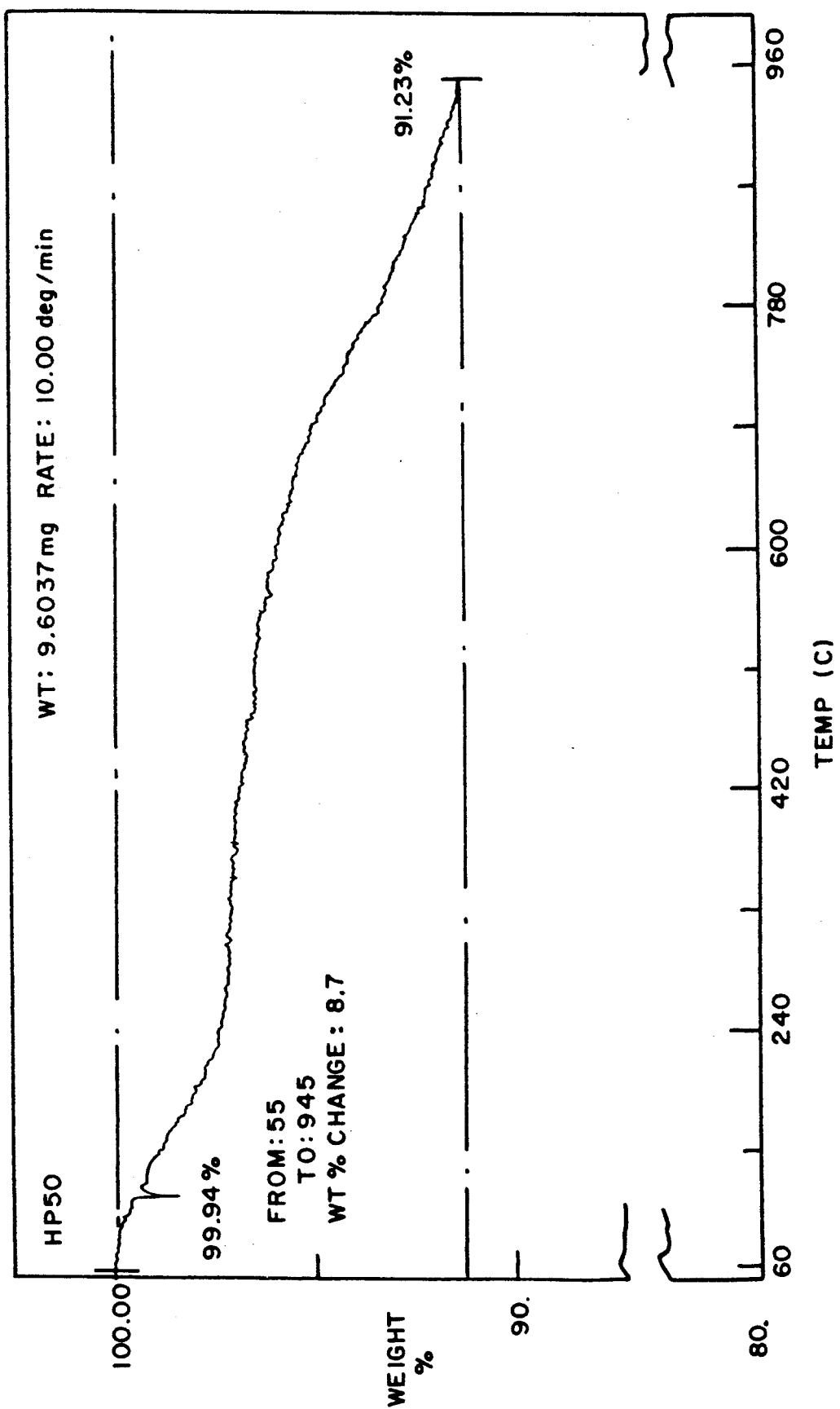
FIG. 7 shows a TGA trace of the products of Example 7.
Figure 8:
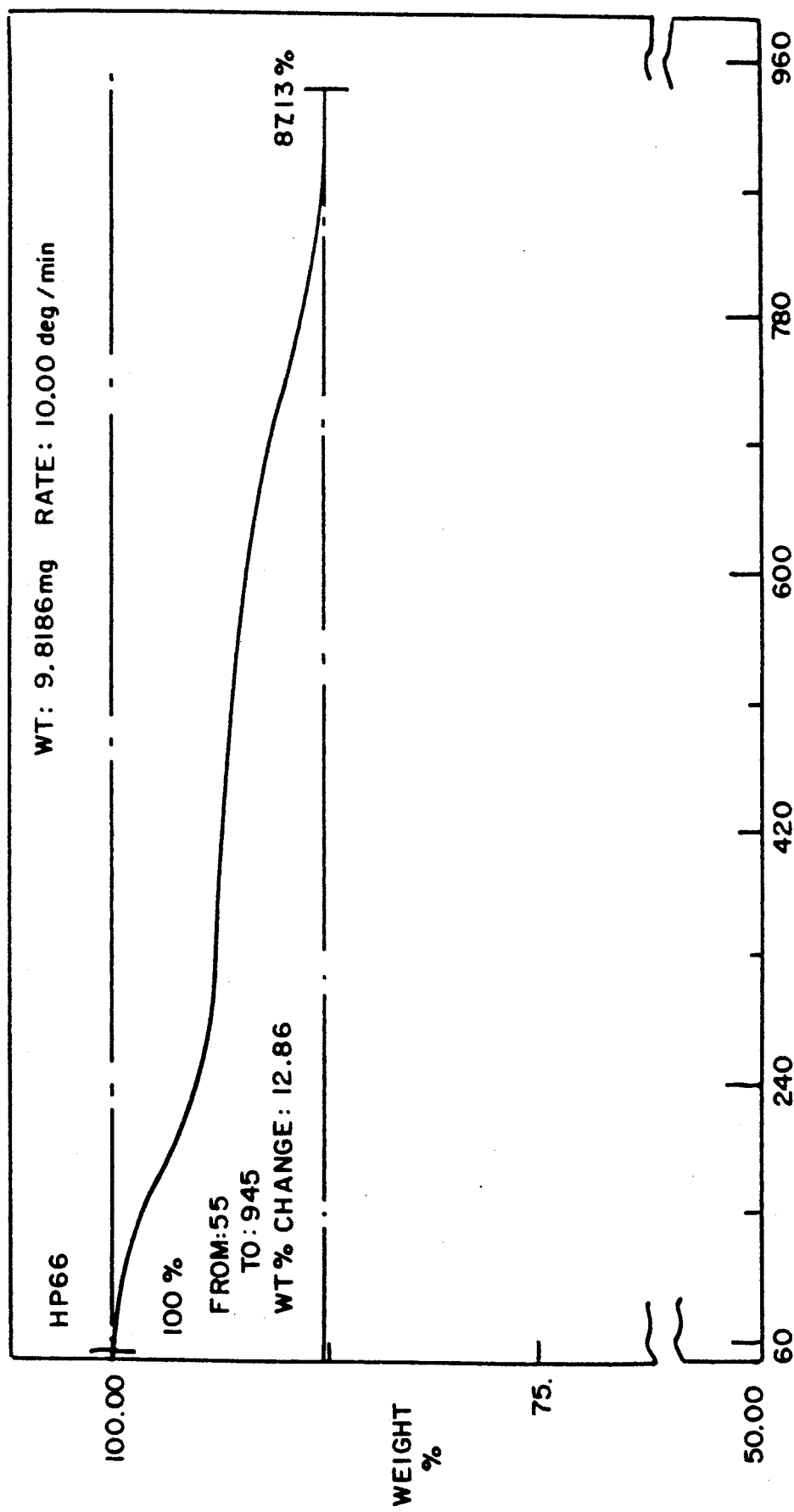
FIG. 8 shows a TGA trace of the products of Example 8.
Figure 9:
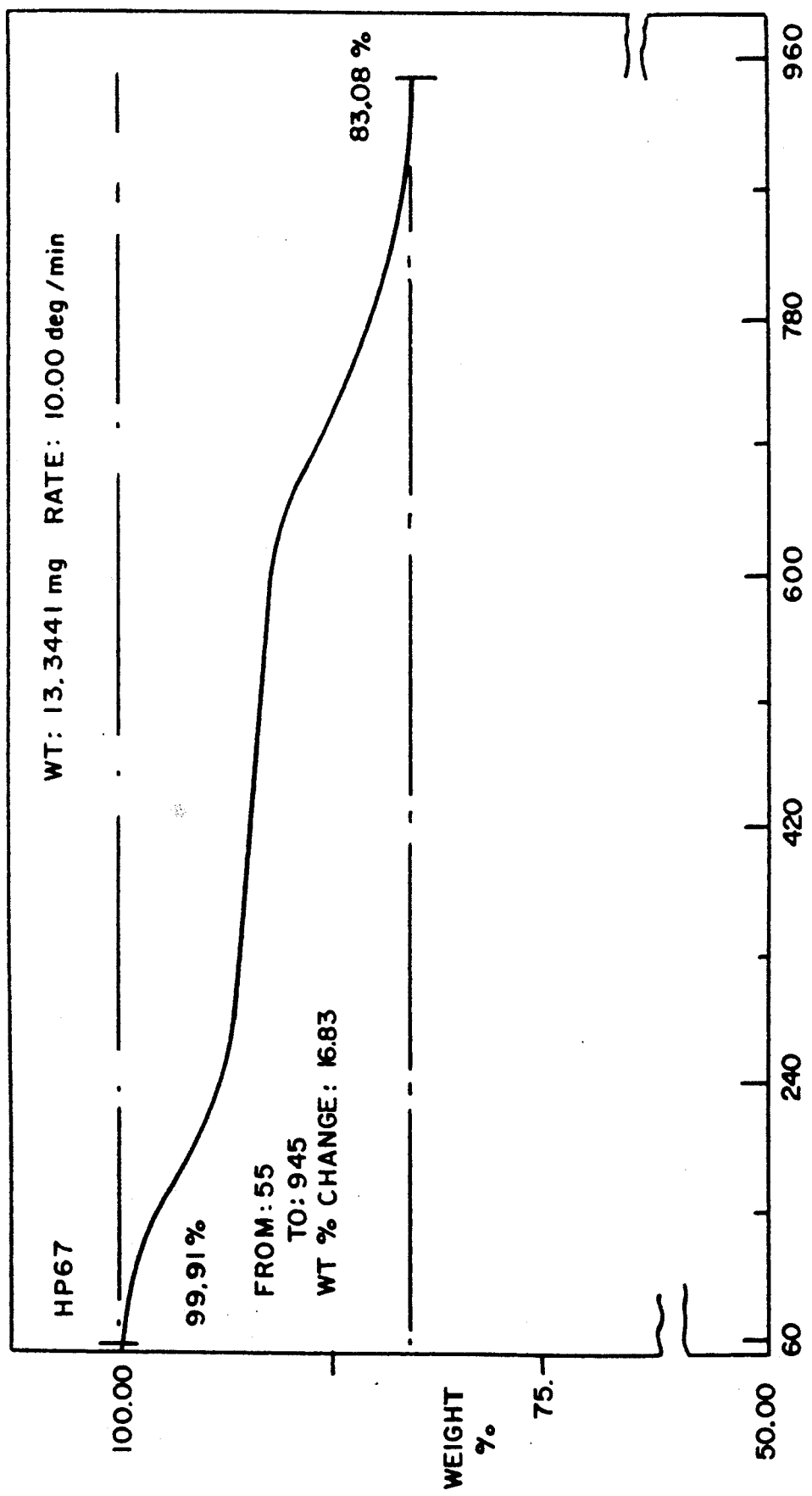
FIG. 9 shows a TGA trace of the products of Example 9.
Figure 10:
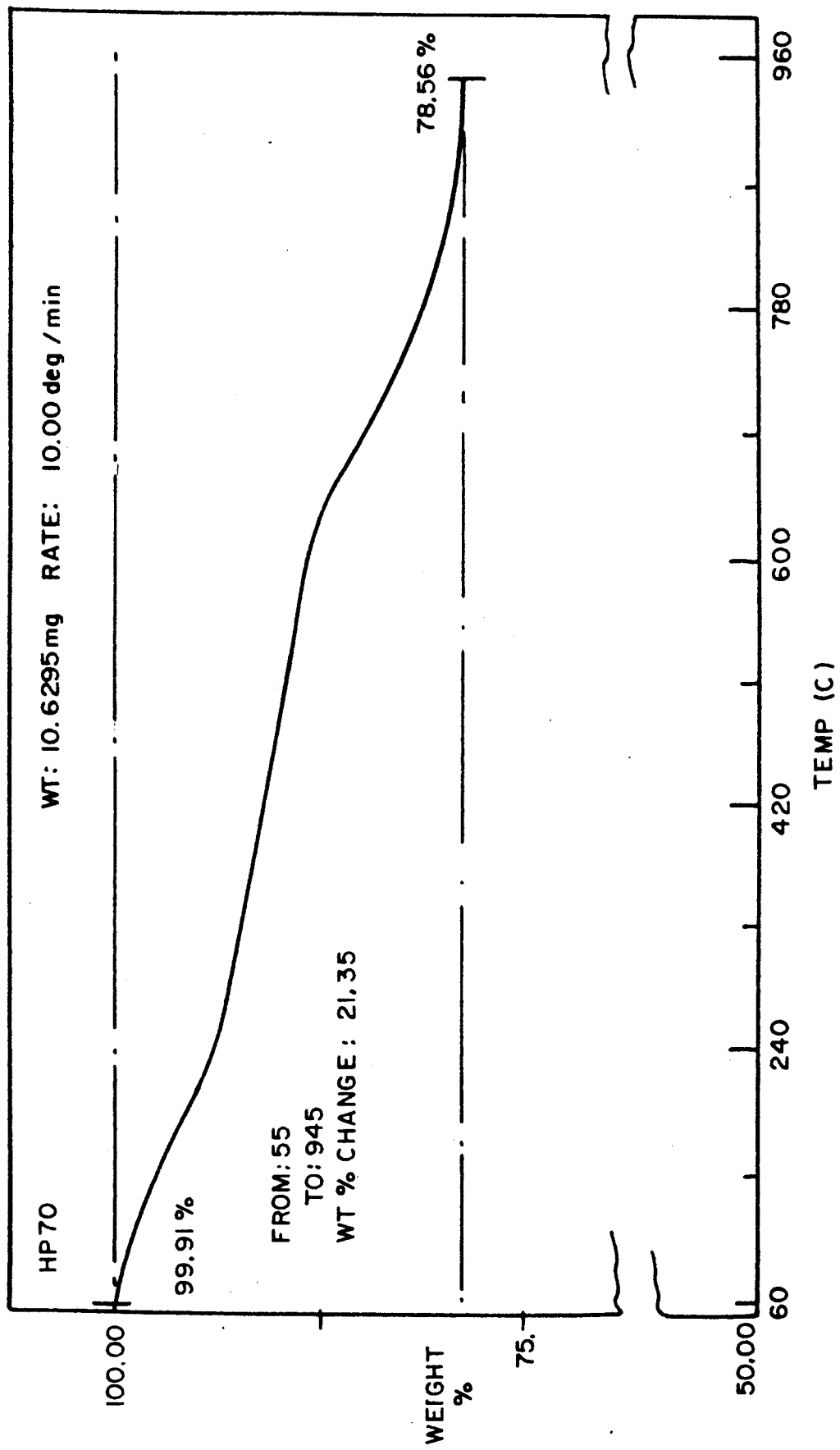
FIG. 10 shows a TGA trace of the products of Example 10.
Figure 11:
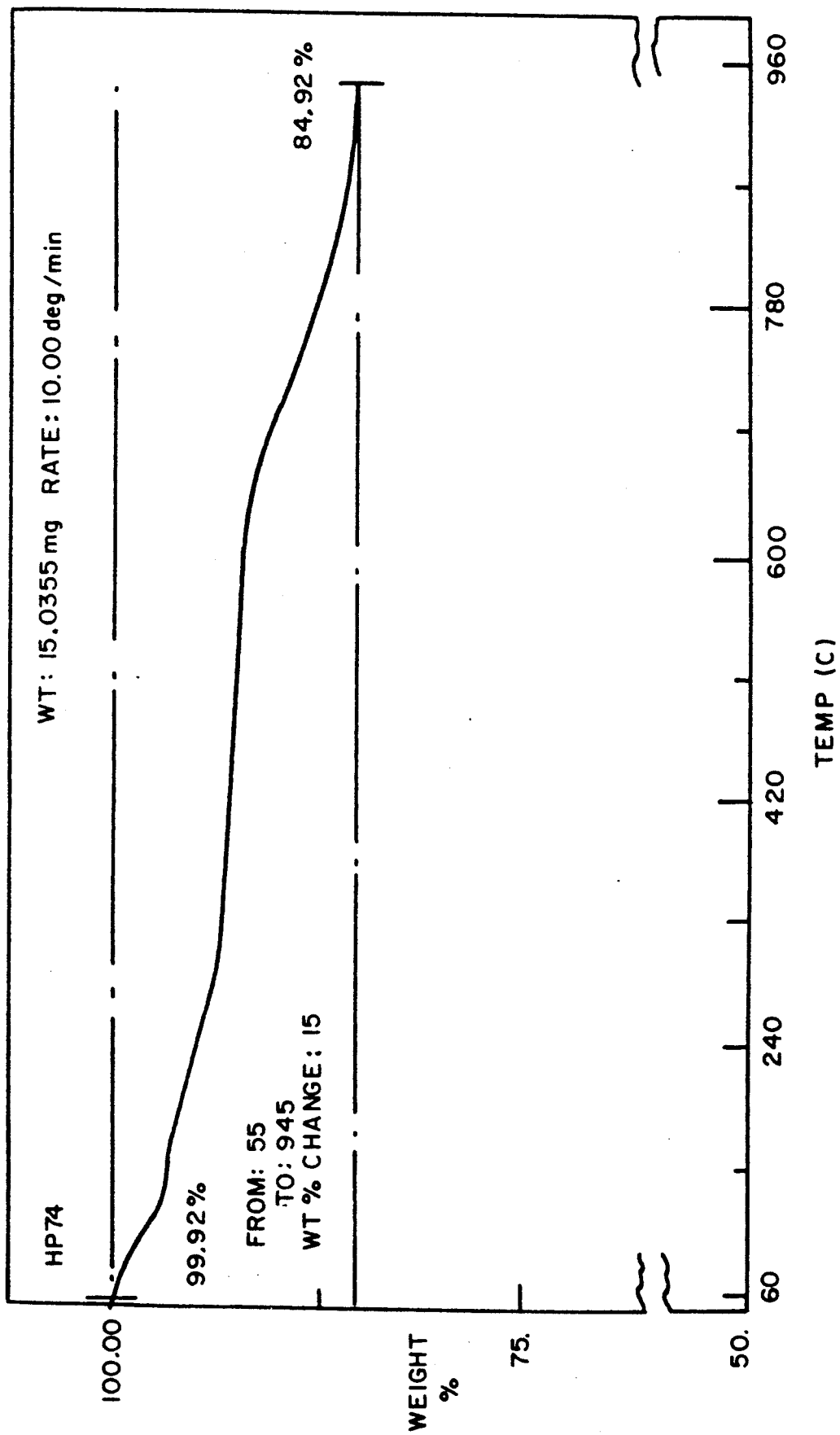
FIG. 11 shows a TGA trace of the products of Example 11.
Figure 12:
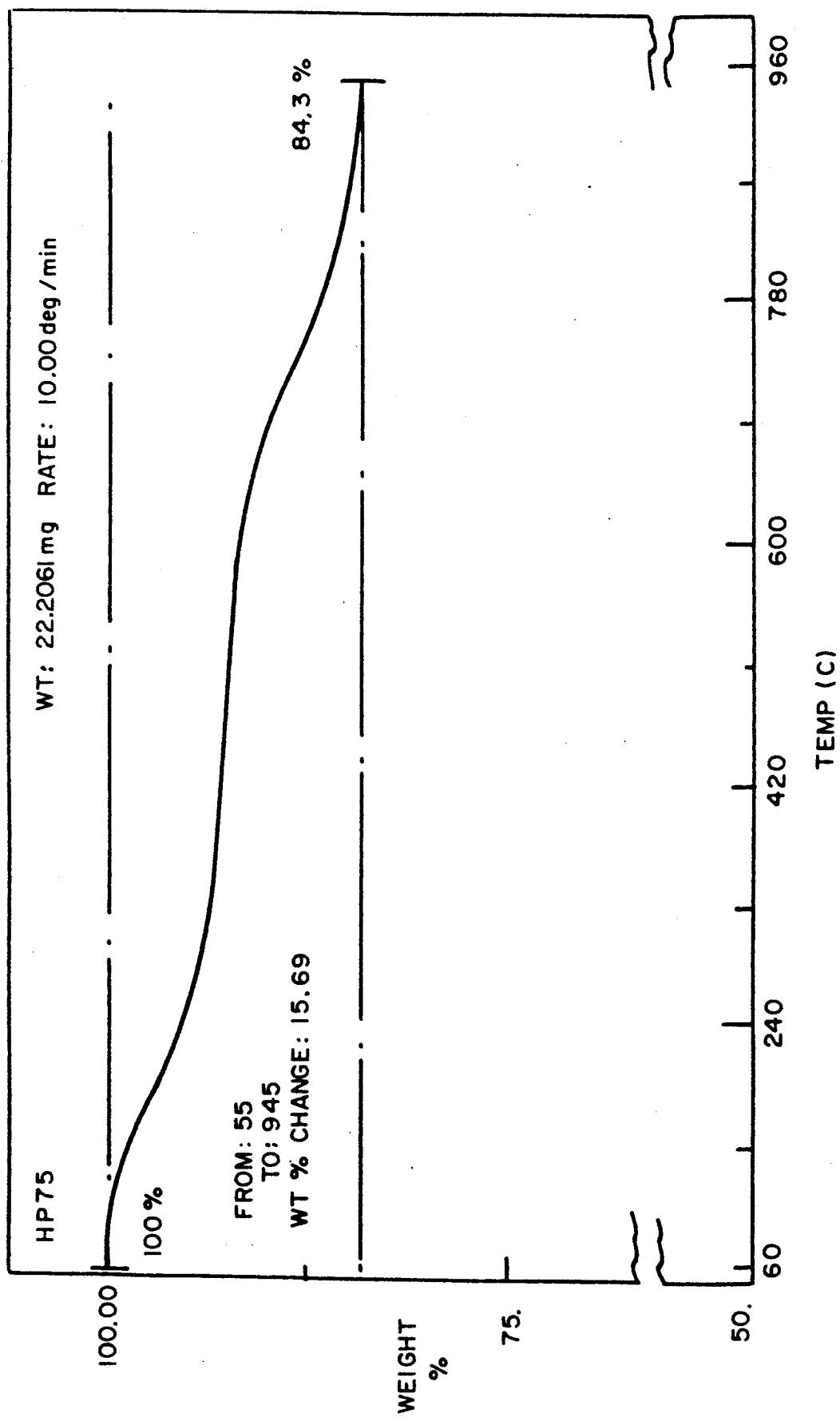
FIG. 12 shows a TGA trace of the products of Example 12.

An organosilicon-boron preceramic polymer can be prepared by reacting an organosilicon oligomer or polymer having a plurality of Si—H or Si—N functional groups with a borane wherein the molar ratio of organosilicon compound repeat unit to borane is 15 or less, more preferably 10 or less. Typically, this preceramic polymer produces a boron-silicon ceramic having a ceramic yield of 60% or greater upon pyrolysis. The preceramic polymer is a processible precursor, and is preferably soluble in organic solvents.

The organosilicon oligomer or polymer is preferably an organic oligosilazane or polysilazane having a plurality of Si—H and Si—N functional groups. More preferably, it is an oligosilazane or polysilazane of the type $[R^1R^2SiNR^3]_n$, wherein $R^1$, $R^2$, and $R^3$ are H or an organic substituent and n is greater than 1. Preferably, the organic group is a lower alkyl group having from 1 to about 8 carbon atoms, a substituted or unsubstituted cycloalkyl group having from 3 to about 8 carbon atoms, a substituted or unsubstituted alkenyl group having from 2 to about 8 carbon atoms, or a substituted or unsubstituted lower aryl group having from 6 to about 10 carbon atoms. The substituents can be a lower alkyl group or a heteroatom (e.g., O, N, S. etc ).

The silazane used is preferably a cyclosilazane. More preferably, it is a cyclosilazane of the formula $[R^1HSiNH]_n$, $[H_2SiNH]_n$ or $[R^1R^2SiNH]_n$. Most preferably it is $[R^1HSiNH]_n$. Preferably, at least one of $R^1$ or $R^2$ is a lower alkyl group. More preferably, it is a methyl group. Mixtures of various silazanes can also be used. For example, $[(R^1R^2SiNH)_n$ and $(R^3R^4SiNH)_n$; $(R^1R^2SiNH)_n$ and $(R^3Si(NH)_{1.5}))_n$, etc., wherein $R^3$ and $R^4$ are defined the same as $R^1$ and $R^2$, but both $R^3$ and $R^4$ are not the same as $R^1$ and $R^2$ and n' is defined as n but may be different than n.

The borane can be one with 3, 2 or 1H substituents per B. However, a $H_3B$. Lewis base complex, diborane, $B_2H_6$, a $RBH_2$. Lewis base complex, an alkylborane, $R_2B_2H_4$, wherein R is an alkyl group, a $R^1R^2NBH_2$. Lewis base complex, wherein $R^1$ and $R^2$ are defined the same as above, and an uncomplexed aminoborane are preferred. The borane is more preferably a $H_3B$. Lewis base complex. For example, $H_3B\cdot S(CH_3)_2$; $H_3B\cdot N(C_2H_5)_3$, $H_3B\cdot C_5H_5N$, $H_3B\cdot S(C_2H_5)_2$, $H_3B\cdot P(CH_3)_3$, $H_3B\cdot AsPh_3$,

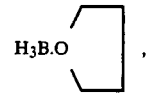

$H_3B\cdot O(CH_3)_2$, $H_3B\cdot N\equiv CCH_3$, and the like.

The organosilicon oligomer or polymer and the borane may be reacted in an organic solvent in which they are both soluble. The solvent can readily be determined by the skilled artisan based upon the present disclosure based upon the particular reactants used. Alternatively, a solvent need not be used. The amounts of organosilicon oligomer or polymer and borane can vary over a wide range. However, the molar ratio of organosilicon repeat unit to borane should be 15 or less, preferably 10 or less.

The reactions are easily carried out. The Si—H and/or Si—N containing organosilicon oligomer or polymer and the borane are combined in a suitable organic solvent. Depending upon the reactants, the reaction can begin at room temperature or with some heating. Preferably, the reaction is carried out under an inert atmosphere. The initiation of the reaction is evidenced by gas evolution. The mixture is stirred until this initial gas evolution ceases, and is then heated slowly to reflux. It is stirred at reflux until the product is formed. Typically, this takes about 1 hour or less in the case of [R$^1$HSiNH]$_n$ silazanes. If a gel forms, the product has been heated too much and reflux should be stopped earlier. The specific time at reflux can vary, however, depending upon the reactants, but it can readily be determined empirically by the skilled artisan based upon this disclosure. For example, one adds to a predetermined amount of an oligosilazane or polysilazane, e.g., the oligosilazane oil obtained by the ammonolysis of methyldichlorosilane, in a suitable organic solvent, a borane, e.g., a 2M toluene solution of H$_3$B·S(CH$_3$)$_2$, and (optionally) extra toluene in a reaction vessel, for example, a three-necked round-bottomed flask equipped with a reflux condenser topped with a nitrogen inlet/outlet tube leading to a Schlenk line, a rubber septum and a magnetic stir-bar, under an inert atmosphere, for example, an atmosphere of dry nitrogen. The initiation of the reaction is evidenced by gas evolution.

With the above-described reactants, gas evolution begins immediately at room temperature. The mixture is then stirred until the initial gas evolution ceases (e.g., ca. 15 minutes for the 30–60 mmol (CH$_3$SiHNH)$_n$ scale used). After the initial gas evolution ceases, the resulting mixture is then heated slowly to the reflux temperature and stirred at reflux until the product is formed, typically 1 hour.

These reactants were heated slowly, ca. 30 minutes to reflux temperature and stirred at reflux for 1 hour, producing a product that was completely soluble in toluene and did not separate from solution as the released (CH$_3$)$_2$S and the toluene solvent were removed at reduced pressure. The products are viscous oils or solids depending on how much H$_3$B·S(CH$_3$)$_2$ was used per molar unit of CH$_3$SiHNH.

Thus, when the CH$_3$SiHNH/BH$_3$ molar ratio was 20, the product was a viscous oil with a cryoscopic molecular weight (in benzene) of 390. The ceramic yield of this material under pyrolysis in an argon stream was only 52%. When the ratio of reactants used was 10, the highly viscous oil produced had an average molecular weight of 520 and a ceramic yield in argon of greater than 60%. Use of a ratio of 4 in this reaction resulted in a soft, low-melting solid, average molecular weight 800, with a ceramic yield under pyrolysis in argon of 83%. A further decrease in the CH$_3$SiHNH/BH$_3$ molar ratio to 3 gave a solid product that, after complete solvent removal, could only be partially redissolved in hot toluene. Further decreases in the CH$_3$SiHNH/BH$_3$ molar ratio used in the reaction result in the formation of solid products that were very soluble in toluene as formed. However, once the toluene had been completely removed, they could not be redissolved in toluene. When these products retained some small amounts of toluene, such that the borasilazane/toluene syrup still flows, they continue to be very soluble. It is only when all the toluene is removed that these solid borasilazanes become insoluble.

As the molar ratio of CH$_3$SiHNH/BH$_3$ decreased from 20 to 1, the yield of ceramic produced on pyrolysis in a stream of argon to 1000° C. increased from 52% for a ratio of 20 to 91% for a ratio of 1. A similar increase of the ceramic yield, from 64% to 87% was observed in bulk pyrolyses carried out in a stream of ammonia See Table 1. Analytical data for these products are given in Table 2. As this ratio decreased, the boron content of the resultant product increased from 1.72%, when the ratio was 10, to 11.42% when the ratio was 1.

Although these products do not appear to have high molecular weights, by using the materials described herein, residual B—H, Si—H and N—H, as well as their B—N and Si—N bonds provide reactive functionality. Although not wishing to be bound by theory, it appears that such functionality permits the high ceramic yields obtained in the pyrolysis.

Additional flexibility in the resultant product can be obtained by using mixtures of Si—H and/or Si—N containing organosilicon oligomers or polymers, preferably organosilazane oligomers or polymers. For example, 1:1, 2:1 and 3:1 molar mixtures of CH$_3$SiHCl$_2$ and CH$_3$SiCl$_3$ can be coammonolyzed. The resulting organosilazane oils are treated with a borane, H$_3$B·S(CH$_3$)$_2$, using 10:1, 4:1 and 2:1 (CH$_3$SiHNH+CH$_3$SiNH$_{1.5}$)/BH$_3$ molar ratios. The 10:1 ratio product was an oil that solidified after 10 hours in vacuo. The other products were solids. In the case of the 1:1 reaction, complete gelation took place during the reflux period to produce an insoluble solid. Pyrolysis of all these products (to 1000° C.) in a stream of argon or ammonia resulted in high (78–87%) ceramic yields. Thus, using these combinations, one can introduce smaller amounts of boron into the product and at the same time obtain a product whose pyrolysis gives a high ceramic yield, which is not possible when CH$_3$SiHCl$_2$ is used alone. Mixtures of organo-chlorosilanes can be used in the initial ammonolysis reaction For example, use of CH$_3$SiHCl$_2$/(CH$_3$)$_2$SiCl$_2$ or CH$_3$SiHCl$_2$/CH$_3$(CH$_2$=CH)SiCl$_2$ mixtures in the initial ammonolysis reaction also is possible.

The oligosilazanes or polysilazanes and mixtures of such can be modified by thermal treatment or by treatment with protic strong acids or ammonium salts at temperatures ranging from 25° C. to 250° C.

Ammonolysis of a partial hydrolysis product of CH$_3$SiHCl$_2$ (produced in situ by addition of one molar equivalent of H$_2$O to two of CH$_3$SiHCl$_2$ in THF) left a mobile oil after removal of volatiles in vacuo. Pyrolysis of this oil (in a stream of argon to 1000° C.) gave a ceramic residue in only 9% yield. In the case of this (CH$_3$Si(H)OSi(CH$_3$)(H)(NH)$_n$ oil, treatment with H$_3$B·S(CH$_3$)$_2$ (1:1 molar ratio) also resulted in formation of a viscous oil whose pyrolysis in a stream of ammonia gave a borosilicon oxynitride in 70% ceramic yield.

The use of CH$_3$SiHCl$_2$-derived oligosilazanes in these reactions is preferable because of their high reactivity. In contrast, the solid [(CH$_3$)$_2$SiNH]$_n$ oligosilazanes (mostly cyclic tetramer), obtained by ammonolysis of (CH$_3$)$_2$SiCl$_2$, was essentially unreactive toward H$_3$B·S(CH$_3$)$_2$ (used in 1:1 molar ratio) in refluxing toluene, during a 1 hour reaction time at reflux as was usual in all the other experiments. No gas evolution was observed. The IR spectrum of the residue after removal of volatiles in vacuo was almost identical with that of the starting (CH$_3$)$_2$SiNH]$_n$. However, when longer reaction times are used when the reaction is carried out in toluene at reflux, or when higher reaction temperatures are used (xylene solution at reflux), the reaction does proceed, slowly in the first instance, rather more rapidly in the second. As aforesaid, such changes in heating, reflux time, and solvent used can be determined empirically.

Pure polymer bars can be pressed and then "fired" to give ceramic bars in a stream of either argon or ammonia. The present preceramic polymers can be used as binders for fabricating shaped articles (bars) from ceramic powders (e.g., $Si_3N_4$, BN, SiC). For example, in the case of SiC, the "preceramic" polymer does double duty: as a binder and, since it contains boron, as a sintering aid. In view of the relative cheapness of the starting materials and the very simple reaction chemistry involved, the synthesis of $Si_3N_4$/BN blend powders by the described procedure should be very practical.

These soluble preceramic polymers also can be used as starting materials for $Si_3N_4$/BN coatings on ceramic fibers and on oxidizable articles such as carbon/carbon composites.

Also, long fibers can be drawn from very concentrated syrups of the solid preceramic polymer in organic solvent, e.g., in toluene. Pyrolysis of these fibers in a stream of ammonia, without a further cure step, resulted in the formation of ceramic fibers that are solid and have a smooth surface.

This invention will be further illustrated by the examples that follow:

General Comments

Because Si—N and B—N compounds often are readily hydrolyzed by atmospheric moisture (this certainly is the case for $(CH_3SiHNH)_n$), all experiments were carried out under a protective atmosphere of dry nitrogen. The borasilazane products were handled, usually in an inert atmosphere box, with exclusion of air and moisture. Toluene was distilled under nitrogen from sodium benzophenone ketyl. The $H_3B \cdot S(CH_3)_2$ was purchased as a 2M solution in toluene from Aldrich Chemical Co., chlorosilanes from Petrarch Systems Silanes, Huls America. Inc.

The reported molecular weights were determined by cryoscopy in benzene. Thermogravimetric analyses (TGA) were performed using a Perkin-Elmer TGS-2 System. All samples were heated from 50° C. to 950° C. at 10° C. per minute. Larger scale bulk pyrolyses were carried out in a Lindberg Model 59344 tube furnace with a Eurotherm controller. The samples were placed in a fused silica boat in a 1.5 inch o.d. quartz tube and heated from 25° C. to 1000° C. at 5° C. per minute in a stream of argon or ammonia; they were held at 1000° C. for 2 hours. Pyrolyses to 1500° C. were carried out in argon in a Lindberg Model 59545 tube furnace with samples in a boron nitride boat in a 2.5 inch o.d. mullite tube. A hardened stainless steel die was used for forming 1.5 inch×0.5 inch bars. A Carver laboratory press was used for bar formation. Isostatic bar compaction was carried out in a pneumatically driven oil press with the bars wrapped in Saran Wrap and contained in evacuated, sealed rubber bags.

Ammonolysis of $CH_3SiHCl_2$

The reaction was carried out as follows.

A one liter, three-necked flask was equipped with an overhead mechanical stirrer, a cold (−78° C.) condenser leading to a mercury bubbler and a septum and was flame-dried under a strong flow of nitrogen ("standard reaction apparatus"). Diethyl ether (350 ml, distilled from sodium benzophenone) and 32.1 g (0.279 mol) of $CH_3SiHCl_2$ (distilled from metallic magnesium) were added to the flask and cooled to 0° C. An excess of gaseous ammonia (Matheson, dried by passing it through a column of KOH pellets) was added, with stirring, to the solution through a syringe needle at a rate of 2.0 ml gas per second for 4 hours. A total of 1.18 mol of $NH_3$ was added.

The reaction mixture was allowed to warm to room temperature and the cold condenser was replaced by an air condenser in order to allow the unconverted ammonia to escape as the reaction mixture was stirred for another 4 hours. Filtration (in a dry box) of the reaction mixture (350 ml. medium-frit funnel) removed the precipitated ammonium chloride. The latter was washed with four 75 ml portions of ether. The combined filtrates were trap-to-trap distilled (room temperature/0.03 mmHg) into a cold trap to remove the diethyl ether. The residue, $(CH_3SiHNH)_n$, was a clear, mobile liquid (11.63 g. 70% yield).

The reaction can also be carried out as described above using THF as the reaction solvent.

Coammonolyses of $CH_3SiHCl_2$ and $CH_3SiCl_3$ (in 3:1, 2:1 and 1:1 molar ratio) were carried out as described in U.S. Pat. No. 4,720,532 (Jan. 9, 1988) which is incorporated herein by reference. Coammonolyses of $CH_3SiHCl_2$ and $(CH_3)_2SiCl_2$ and of $CH_3SiHCl_2$ and $CH_3(CH_2=CH)SiCl_2$ were carried out in similar manner.

Reaction of $(CH_3SiHNH)_n$ with $H_3B \cdot S(CH_3)_2$

The general procedure is given below Table 1 gives the details of the specific reactions provided in Examples 1-7.

A 50 or 100 ml three-necked, round-bottomed flask equipped with a rubber septum, a magnetic stir-bar and a reflux condenser topped with a gas inlet/outlet tube that was connected to a Schlenk line was charged by syringe with the specified amounts of $(CH_3SiHNH)_n$ (obtained by the $CH_3SiHCl_2/NH_3$ reaction), $H_3B \cdot S(CH_3)_2$ (2M solution in toluene) and, in some cases, extra toluene as set forth in Table 1. Gas evolution ($H_2$) commenced on mixing the reactants at room temperature. The mixture was stirred at room temperature until gas evolution ceased (generally 15 minutes) and then was heated slowly (during 30 minutes) to reflux. It was stirred at reflux for 1 hour.

The resulting clear solution was vacuum distilled to remove volatiles ($(CH_3)_2S$ and toluene). The residue was either a viscous oil or a solid, depending on the $CH_3SiHNH/BH_3$ ratio used. See Table 1.

Reaction of $[(CH_3SiHNH)_a(CH_3Si(NH)_{1.5})_b]_n$ Polysilazanes with $H_3B \cdot S(CH_3)_2$ In the standard reaction apparatus a solution of the polysilazane in toluene was prepared and the specified volume of a 2M solution of $H_3B \cdot S(CH_3)_2$ in toluene was added by syringe as set forth in Table 2. The resulting solution was stirred at room temperature until gas evolution ceased (about 15 minutes) and then was heated slowly to reflux. Refluxing was stopped after 1 hour or earlier, if the product gelled.

Details of separate experiments are given in Table 2.

Hydrolysis/Ammonolysis of $CH_3SiHCl_2$ and Reaction of the Product with $H_3B \cdot S(CH_3)_2$ To a stirred solution of 44.9 g (0.39 mol) of $CH_3SiHCl_2$ in THF at 0° C. was added, over about a 5 minute period, 3.4 g (0.18 mol) of $H_2O$ by syringe. After the mixture had been stirred for 30 minutes, ammonia was bubbled into it for about 2 hours. The reaction mixture was left to stand overnight and then was filtered. The salts were washed with THF and the combined THF solutions were evaporated in vacuo (10 hours at room temperature). A cloudy, mobile oil, 20 g, MW 335 by cryoscopy, remained. Ceramic yield (in argon to 1000° C.; TGA) 9%. Pyrolysis in a stream of ammonia to 1000° C. resulted in a 14% yield of ceramic residue.

The hydrolysis/ammonolysis product of assumed composition [CH$_3$(H)SiOSi(CH$_3$)(H)NH]$_n$ had the following spectroscopic properties:

IR (film, cm$^{-1}$): 3,380 (m, NH), 1,960 (m), 2,150 (vs, SiH), 1,410 (w) 1,260 (vs, Si-CH$_3$), 1,180 (vs), 1,075 (vs), 970 (vs), 880 (vs), 770 (s)

$^1$H NMR (C$_6$D$_6$): δ 0.15 (SiCH$_3$), 0.5-1.6 (NH), 4.7 (SiH)

To 2.17 g of the assumed [CH$_3$(H)Si-OSi(CH$_3$)(H)NH]$_n$ in 10 ml of toluene was added 4.5 ml of 2M H$_3$B·S(CH$_3$)$_2$ in toluene. Further treatment and workup were identical with those in the (CH$_3$SiHNH)$_n$/H$_3$B·S(CH$_3$)$_2$ experiments. The product was a viscous oil, MW 615. Pyrolysis to 1000° C. in a stream of argon (TGA) gave a 65% ceramic yield. In a stream of ammonia, the pyrolysis residue yield was 70%.

In a similar experiment in which 9.0 ml of 2M H$_3$B·S(CH$_3$)$_2$ in toluene was used, the resulting oil had MW 840. Pyrolysis in argon to 1000° C. gave a ceramic yield of 79% in a stream of ammonia, 69%.

The $^{11}$B NMR spectra of both products showed a very broad signal at 33 ppm.

Analytical and Spectroscopic Characterization of Borasilazanes

Table 3 lists the results of the elemental analyses of the borasilazanes for C, H, N, B and Si.

The IR and the $^1$H, $^{13}$C, $^{11}$B and $^{29}$Si NMR spectra of the borasilazanes were recorded. In the $^{11}$B NMR spectra of all of these products a single, very broad (1,400 Hz width at half-height) resonance at 33 ppm (vs BF$_3$·Et$_2$O) was observed. This is indicative of a boron atom bonded to two nitrogen atoms.

The $^{29}$Si NMR spectra of the borasilazanes showed very broad signals in the −19 to −23 ppm (vs. (CH$_3$)$_4$Si) range.

Figure 13:
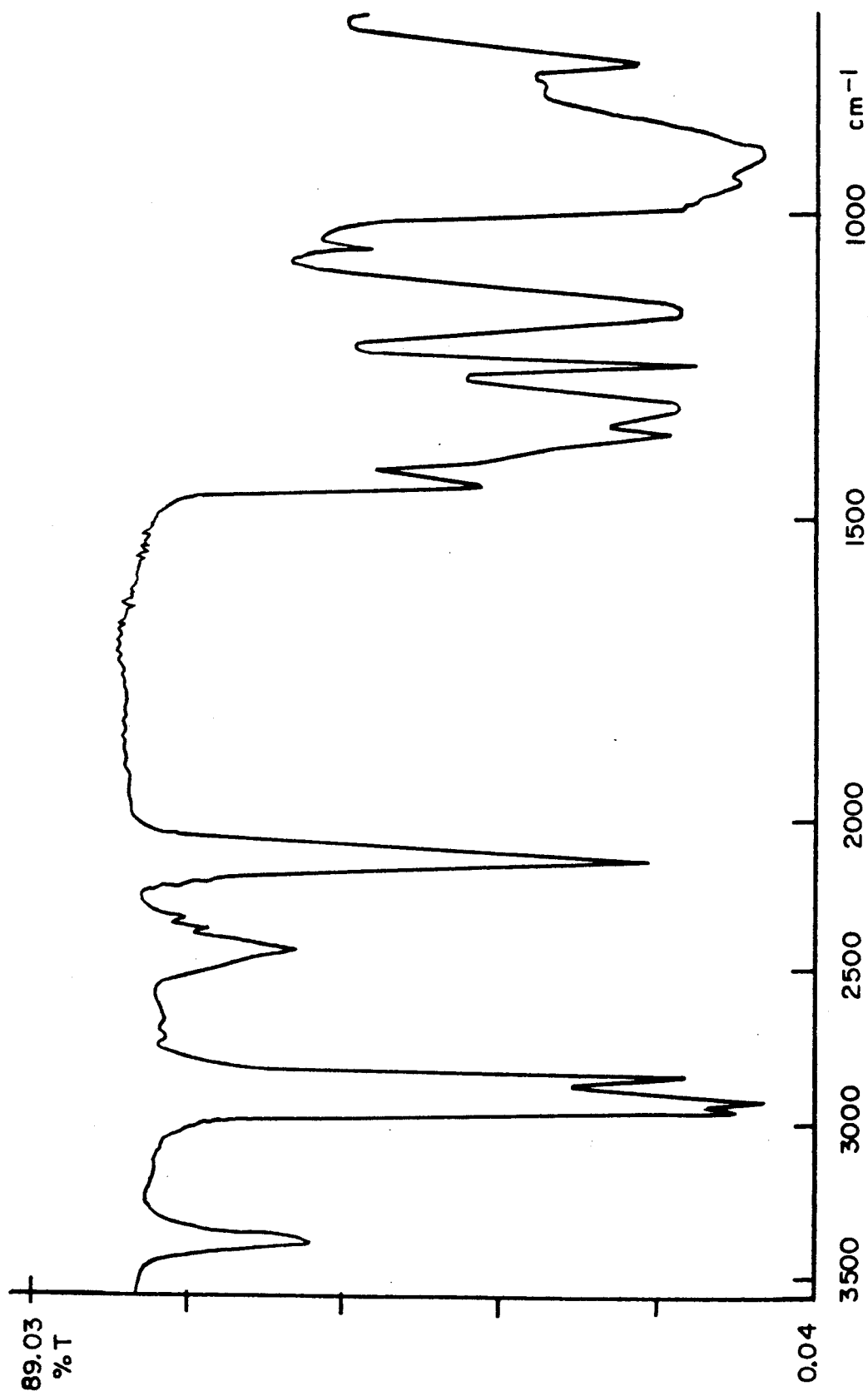
FIG. 13 shows the IR spectrum of the products of Example 3.
Figure 14:
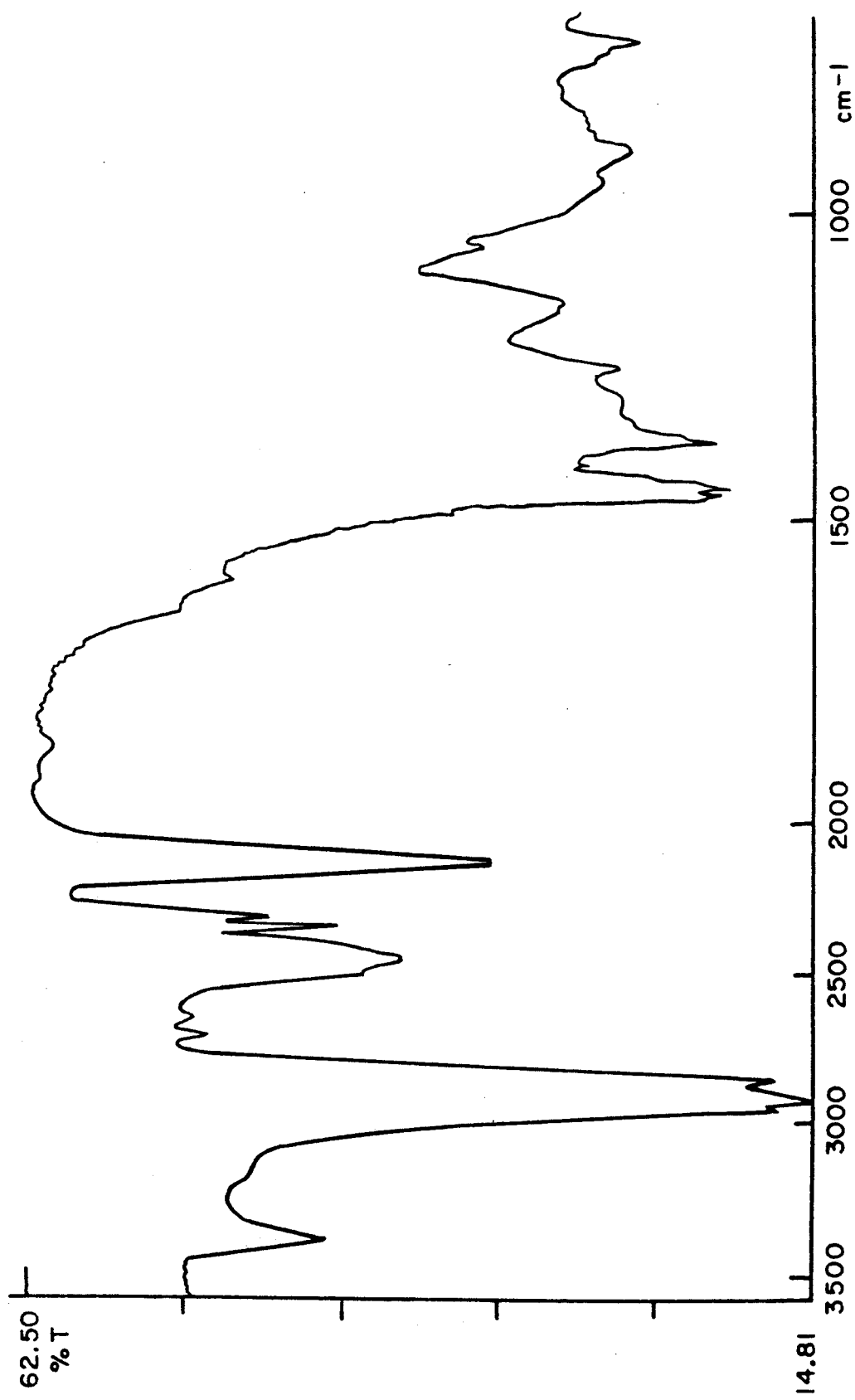
FIG. 14 shows the IR spectrum of the products of Example 7.

The proton NMR spectra were unexceptional, showing broad signals in the Si—CH$_3$, Si—H and N—H regions. In the IR spectra the N—H, B—H, Si—H and Si—CH$_3$ stretching fequencies were observed. FIGS. 13 and 14 show the IR spectra of the products of Examples 3 and 7.

The spectroscopic data were indicative of the presence of the various constituent groups. Si—CH$_3$, Si—H, B—H, N—H, but provided no useful information about the structure of borasilazanes.

Pyrolyses

Pyrolysis of the borasilazanes to 1000° C. and to 1500° C. in a stream of argon resulted in a black ceramic residue that contained substantial amounts of carbon (see analytical data for pyrolysis products of Example 6 (HP 55) in footnote b of Table 3) Pyrolysis of the borasilazanes to 1000° C. in a stream of ammonia served to remove most of the carbon (see analyses Table 3) and gave a white ceramic residue of a "borosilicon nitride". Such samples, when heated under argon to 1500° C. became darker, grey in the case of samples with lower boron content, dark grey when the boron content was high (see analyses Table 3).

Table 3, footnote c, gives the nominal compositions of the ceramic materials produced. Since the products were amorphous, showing no lines due to BN or Si$_3$N$_4$ in the powder X-ray pattern, it is unlikely that discrete BN and Si$_3$N$_4$ phases are present. It is probable that the amorphous phase contains silicon and boron atoms randomly bonded to nitrogen atoms.

A polymer bar was pressed from 3.42 g of product HP55 (Example 6), of dimensions 3.84×1.32×0.69 cm and with a density of 0.98 g cm$^{-3}$. Pyrolysis in an argon stream gave a ceramic bar of the same rectangular shape, 3.0 g (88% ceramic yield), of dimensions 3.00×1.03×0.55 cm (50% volume reduction), with a density of 1.76 g cm$^{-3}$. The bar was fairly strong.

The borasilazane of Example 6 (HP-55) could be used to make ceramic fibers. A solution of this borasilazane in toluene prepared as described above was evaporated to remove most of the toluene, leaving a tacky solid. Fibers up to 100 cm in length could be drawn from this material by sticking a stirring rod into it and withdrawing it rapidly. When these fibers were fired in a stream of ammonia to 1000° C., white ceramic fibers were obtained. A scanning electron microscope picture of the cross-section and surface of such a fiber, shows that the fiber has, for the most part, a smooth surface and that it is solid all the way through.

This invention has been described in detail with reference to the preferred embodiments thereof. However, it will be appreciated that those skilled in the art, upon consideration of this disclosure may make modifications and improvements within the spirit and scope of the invention.

TABLE 1

Reactions of (CH$_3$SiHNH)$_n$ with H$_3$B.SMe$_2$ in Toluene

| Example No. (Code No.) | (CH$_3$SiHNH)$_{n'}$ g (mmol) | H$_3$B.SMe$_2$ (2M in toluene), ml (mmol) | CH$_3$SiHNH / BH$_3$ Molar Ratio | Toluene ml. | Product Yield, g | Product Description | Ceramic Yield in Ar stream (TGA)$^a$ | Ceramic Yield in NH stream (bulk pyrolysis) |
|---|---|---|---|---|---|---|---|---|
| 1 (HP51) | 1.83 (31) | 0.8 (1.55) | 20 | 10 (2 hr. at reflux) | 1.7 | viscous oil, MW 390 | 52 | 64 |
| 2 (HP52) | 2.14 (36.3) | 1.8 (3.6) | 10 | 10 | 1.9 | very viscous oil, MW 520 | 62 | 68 |
| 3 (HP53) | 2.83 (48) | 6.0 (12) | 4 | 10 | 2.9 | soft, low melting solid, MW 800 | 74 | 76 |
| 4 (HP72) | 2.32 (39.3) | 6.55 (13.1) | 3 | none | 2.4 | white solid (once dried, only partially sol. in | 83 | 84 |

TABLE 1-continued

Reactions of $(CH_3SiHNH)_n$ with $H_3B.SMe_2$ in Toluene

| Example No. (Code No.) | $(CH_3SiHNH)_{n'}$ g (mmol) | $H_3B.SMe_2$ (2M in toluene), ml (mmol) | $\dfrac{CH_3SiHNH}{BH_3}$ Molar Ratio | Toluene ml. | Product Yield, g | Product Description | Ceramic Yield in Ar stream (TGA)$^a$ | Ceramic Yield in NH stream (bulk pyrolysis) |
|---|---|---|---|---|---|---|---|---|
| 5 (HP73) | 2.26 (38.3) | 7.66 (15.3) | 2.5 | none | 2.3 | white solid (once dried, insol. in toluene) | 88 | 82 |
| 6 (HP55) | 2.0 (34) | 8.55 (17) | 2 | none | 2.25 | white solid (once dried), insol. in toluene) | 90 | 82 |
| 7 (HP50) | 2.3 (39) | 19.5 (39) | 1 | none | 2.6 | white solid (once dried, insol. in toluene | 91 | 87 |

1-7 show the TGA traces of the products of Ex. 1-7.

TABLE 2

Reactions of $CH_3SiHCl_2/CH_3SiCl_3$ Coammonolysis Products with $H_3B.SMe_2$ in Toluene

| Example No. (Code No.) | $(CH_3SiHNH)_{n'}$ g (mmol) | $H_3B.SMe_2$ (2M in toluene), ml (mmol) | $\dfrac{CH_3SiHNH}{BH_3}$ Molar Ratio | Toluene ml. | Product Yield, g | Product Description | Ceramic Yield in Ar stream (TGA)$^d$ | Ceramic Yield in NH stream (bulk pyrolysis) |
|---|---|---|---|---|---|---|---|---|
| 8 (HP66) | 2.6 (41.7)$^a$ | 13 (26)$^a$ | 1.6 | 20 | 2.75 | gelled after 30 min. reflux, white solid | 87 | 83 |
| 9 (HP67) | 3.2 (51.3)$^a$ | 8 (16)$^a$ | 3.2 | 25 | 3.15 | white solid | 83 | 87 |
| 10 (HP70) | 2.0 (32)$^a$ | 2 (4)$^a$ | 8 | 10 | 2.0 | viscous oil, became solid after 10 hours in vacuo | 79 | 72 |
| 11 (HP74) | 2.45 (40)$^b$ | 5.8 (11.6)$^b$ | 3.45 | 20 | 2.45 | white solid | 85 | 81 |
| 12 (HP75) | 2.55 (41.9)$^c$ | 5.8 (11.6)$^c$ | 3.61 | 20 | 2.65 | white solid | 83 | |

$^a$1:1 molar ratio $CH_3SiHCl_2/CH_3SiCl_3$ coammonolysis.
$^b$2:1 molar ratio $CH_3SiHCl_2/CH_3SiCl_3$ coammonolysis.
$^c$3:1 molar ratio $CH_3SiHCl_2/CH_3SiCl_3$ coammonolysis.
$^d$FIGS. 8–12 show the TGA traces of the products of Examples 8–12.

TABLE 3

Analytical Data for the Borasilazanes and their Derived Ceramics

| Example No. (Code No.) | Borasilazanes | | | | | Product of Pyrolysis in $NH_3$ to 1000° C. | | | | Product of $NH_3$ Pyrolysis to 1500° C. in Ar | | | |
|---|---|---|---|---|---|---|---|---|---|---|---|---|---|
| | % C | % H | % N | % B | % Si | % C | % N | % B | % Si | % C | % N | % B | % Si |
| 2 (HP52) | 20.80 | 7.14 | 25.17 | 1.72 | 38.13 | 0.48 | 47.44 | 2.03 | 47.68 | 0.54 | 38.99 | 2.66 | 52.66 |
| 3 (HP53) | 19.54 | 6.15 | 23.77 | 4.28 | 47.01 | 0.32 | 42.72 | 5.38 | 45.28 | 0.34 | 42.71 | 6.31 | 47.90 |
| 4 (HP72) | 18.34 | 6.54 | 20.99 | 5.88 | 34.89 | 0.33 | 43.99 | 5.16 | 45.18 | 0.41 | 41.86 | 5.67 | 44.80 |
| 5 (HP73) | 20.82 | 7.18 | 27.97 | 5.16 | 40.06 | 0.45 | 43.75 | 6.12 | 43.22 | 0.60 | 40.68 | 8.39 | 43.80 |
| 6 (HP55)$^{a,b}$ | 19.88 | 5.93 | 25.04 | 8.10 | 36.26 | 0.22 | 43.43 | 9.63 | 39.86 | 0.19 | 39.80 | 10.11 | 42.78 |
| 7 (HP50) | 19.28 | 5.78 | 22.24 | 11.42 | 32.20 | 0.17 | 45.45 | 10.67 | 35.52 | 0.50 | 38.59 | 11.31 | 36.73 |
| 8 (HP66) | 18.44 | 6.22 | 18.66 | 8.77 | 33.85 | 0.61 | 44.49 | 9.75 | 41.78 | | | | |
| 9 (HP67) | 24.22 | 6.81 | 19.50 | 1.99 | | | | | | | | | |
| 10 (HP76) | 21.21 | 6.76 | 28.2 | 1.38 | 37.49 | 1.00 | | | | | | | |
| 11 (HP74) | 20.66 | 6.70 | 24.72 | 4.11 | 35.85 | 0.5 | 43.02 | 5.36 | 47.70 | 0.25 | 39.71 | 4.98 | 48.97 |
| 12 (HP75) | 16.95 | 6.52 | 17.67 | 4.83 | 39.97 | 0.76 | 43.44 | 5.60 | 43.78 | 0.68 | 43.49 | 3.00 | 49.96 |

$^a$% S: 0.058
$^b$Pyrolyzed in argon to 1000° C., then to 1500° C.:
to 1000° C.: 16.06% C, 27.80% N, 9.66% B, 44.08% Si
to 1500° C.: 15.80% C, 27.75% N, 10.56% B, 42.48% Si
$^c$Nominal compositions calculated from these data:
HP52: BN + 2.5 $Si_3N_4$
HP53: BN + $Si_3N_4$
HP72: BN + $Si_3N_4$
HP73: BN + 0.66 $Si_3N_4$
HP55: BN + 0.54 $Si_3N_4$
HP50: BN + 0.42 $Si_3N_4$
HP74: BN + 1.26 $Si_3N_4$
HP75: BN + 2.1 $Si_3N_4$

We claim:

1. A processable preceramic formed by reacting:
   (a) an organosilicon oligomer or polymer containing a plurality of Si—H or Si—N functional groups, with
   (b) a borane for a sufficient time to form said processable preceramic polymer, wherein the molar ratio of Si—H or Si—N functional groups to borane is 15 or less.

2. The preceramic polymer of claim 1, wherein the molar ratio of Si—H or Si—N functional groups to borane is 10 or less.

3. The preceramic polymer of claim 1, wherein the organosilicon oligomer or polymer having a plurality of Si—H and/or Si—N functional groups is an organic polysilazane.

4. The preceramic polymer of claim 1, wherein the organosilicon oligomer or polymer containing a plurality of Si—H and/or Si—N functional groups is a polysilazane of the formula $[R^1R^2SiNR^3]_n$, wherein $R^1$, $R^2$, and $R^3$ are H or an organic group, and $R^1$, $R^2$, and $R^3$ may all be the same or different and n is greater than 1.

5. The preceramic polymer of claims 1, 2 or 3, wherein the organosilicon oligomer or polymer is reacted with the borane in an organic solvent in which both are soluble.

6. The preceramic polymer of claim 4 wherein the organic group is a lower alkyl group having from 1 to about 8 carbon atoms, a substituted or unsubstituted cycloalkyl group having from 3 to about 8 carbon atoms, a substituted or unsubstituted alkenyl group having from 2 to about 8 carbon atoms or a substituted or unsubstituted lower aryl group having from 6 to about 10 carbon atoms, and wherein the substituents can be a lower alkyl group or a heteroatom.

7. The preceramic polymer of claim 3, wherein the borane has 1, 2 or 3 H atoms substituents per B atoms.

8. The preceramic polymer of claim 7, wherein the borane is selected from the group consisting of $H_3B$·Lewis base complexes $B_2H_6$, $RBH_2$·Lewis base complexes, wherein R is an alkyl group, $R_2B_2H_4$, $R^1R^2NBH_2$·Lewis base complexes, wherein $R^1$ and $R^2$ are H, a lower alkyl group having from 1 to about 8 carbon atoms, a substituted or unsubstituted cycloalkyl group having from 3 to about 8 carbon atoms, a substituted or unsubstituted alkenyl group having from 2 to about 8 carbon atoms or a substituted or unsubstituted lower aryl group having from 6 to about 10 carbon atoms, wherein the substituents can be a lower alkyl group or a heteroatom, and $R^1$ and $R^2$ may be the same or different, and uncomplexed aminoboranes.

9. The preceramic polymer of claim 5, wherein the borane has 1, 2 or 3 H substituents per B.

10. The preceramic polymer of claim 9, wherein the borane is selected from the group consisting of $H_3B$·Lewis base complexes, $B_2H_6$, $RBH_2$·Lewis base complexes, wherein R is an alkyl group, $R_2B_2H_4$, $R^1R^2NBH_2$·Lewis base complexes, wherein $R^1$ and $R^2$ are H, a lower alkyl group having from 1 to about 8 carbon atoms, a substituted or unsubstituted cycloalkyl group having from 3 to about 8 carbon atoms, a substituted or unsubstituted alkenyl group having from 2 to about 8 carbon atoms or a substituted or unsubstituted lower aryl group having from 6 to about 10 carbon atoms, wherein the substituents can be a lower alkyl group or a heteroatom, and $R^1$ and $R^2$ may be the same or different, and uncomplexed aminoboranes.

11. The preceramic polymer of claim 6, wherein the borane is selected from the group consisting of $H_3B$·Lewis base complexes, $B_2H_6$, $RBH_2$·Lewis base complexes, wherein R is an alkyl group $R_2B_2H_4$, $R^1R^2NBH_2$·Lewis base complexes, wherein $R^1$ and $R^2$ are H or an organic group, wherein the organic group is a lower alkyl group having from 1 to about 8 carbon atoms, a substituted or unsubstituted cycloalkyl group having from 3 to about 8 carbon atoms, a substituted or unsubstituted alkenyl group having from 2 to about 8 carbon atoms or a substituted or unsubstituted lower aryl group having from 6 to about 10 carbon atoms, and wherein the substituents can be a lower alkyl group or a heteroatom, and $R^1$ and $R^2$ may be the same or different, and uncomplexed aminoboranes.

12. The preceramic polymer of claim 11, wherein the organosilicon oligomer or polymer is reacted with the borane in an organic solvent in which both are soluble.

13. The preceramic polymer of claim 4, wherein the molar ratio of $[R^1R^2SiNR^3]/BH_3$ is 10 or less.

14. The preceramic polymer of claim 5, wherein said preceramic polymer is soluble in an organic solvent.

15. The preceramic polymer of claim 6, wherein said preceramic polymer is soluble in an organic solvent.

16. The preceramic polymer of claim 6, wherein at least one of $R^1$, $R^2$, and $R^3$ is a lower alkyl group.

17. The preceramic polymer of claim 16, wherein the lower alkyl group is $CH_3$.

18. The preceramic polymer of claim 3, wherein said organosilicon polymer having a plurality of Si—H and/or Si—N functional groups is a mixture of organic oligosilazanes or polysilazanes.

19. The preceramic polymer of claim 6, wherein the polysilazane is a mixture of oligosilazanes or polysilazanes.

20. The preceramic polymer of claim 12, wherein the polysilazane is a mixture of oligosilazanes or polysilazanes.

21. The preceramic polymer of claim 19, wherein the mixture of organic oligosilazanes or poysiazanes is selected from the group consisting of $(R^1R^2SiNH)_n$, $(R^3R^4SiNH)_n$, $R^3Si(NH)_{1.5})_n$, wherein $R^4$ is defined the same as $R^1$, $R^2$, and $R^3$, but may be the same or different than any of $R^1$, $R^2$, and $R^3$.

22. The preceramic polymer of claim 20, wherein the mixture of organic oligosilazanes or polysilazanes is selected from the group consisting of $(R^1R^2SiNH)_n$, $(R^3R^4SiNH)_n$, $(R^3Si(NH)_{1.5})_n$, wherein $R^4$ is defined the same as $R^1$, $R^2$ and $R^3$ but may be the same or different than any of $R^1$, $R^2$, and $R^3$.

23. The preceramic polymer of claim 17, wherein the mixture of organic oligosilazanes or polysilazanes is obtained in an initial ammonolysis reaction.

24. The preceramic polymer of claim 18, wherein the mixture of organic oligosilazanes or polysilazanes is obtained in an initial ammonolysis reaction.

25. The preceramic polymer of claim 24, wherein the mixture of oligosilazanes or polysilazanes is $CH_3SiHCl_2/(CH_3)_2SiCl_2$ or $CH_3SiHCl_2/CH_3(CH_2=CH)SiCl_2$ mixtures.

26. The preceramic polymer of claim 11, wherein said borane is selected from the group consisting of $H_3B·S(CH_3)_2$, $H_3B·N(C_2H_5)_3$, $H_3B·C_5H_5N$, $H_3B·S(C_2H_5)_2$, $H_3B·P(CH_3)_3$, $H_3B·AsPh_3$, $$H_3B·O\left[\phantom{xx}\right],$$

$H_3B·O(CH_3)_2$, and $H_3B·N{\equiv}CCH_3$.

27. The preceramic polymer of claim 3, wherein the organic polysilazane is modified by thermal treatment or by treatment with a protic strong acid or an ammonium salt at temperatures ranging from about 25° C. to about 250° C.

28. The preceramic polymer of claim 17, wherein the mixture of organic oligosilazanes or polysilazanes are modified by thermal treatment or by treatment with a protic strong acid or an ammonium salt at temperatures ranging from about 25° C. to about 250° C.

29. The ceramic formed by the pyrolysis of the preceramic polymer of claim 11 for a sufficient time and at a sufficient temperature to form said ceramic.

30. The ceramic formed by the pyrolysis of the preceramic polymer of claim 5 for a sufficient time and at a sufficient temperature to form said ceramic.

31. The ceramic formed by the pyrolysis of the preceramic polymer of claim 16 for a sufficient time and at a sufficient temperature to form said ceramic.

32. The ceramic formed by the pyrolysis of the preceramic polymer of claim 22 for a sufficient time and at a sufficient temperature to form said ceramic.

33. The ceramic formed by the pyrolysis of the preceramic polymer of claim 1 in an inert gas atmosphere for a sufficient time and at a sufficient temperature to form said ceramic.

34. The ceramic formed by the pyrolysis of the preceramic polymer of claim 5 in an inert gas atmosphere for a sufficient time and at a sufficient temperature to form said ceramic.

35. The ceramic formed by the pyrolysis of the preceramic polymer of claim 16 in an inert gas atmosphere for a sufficient time and at a sufficient temperature to form said ceramic.

36. The ceramic formed by the pyrolysis of the preceramic polymer of claim 22 in an inert gas atmosphere for a sufficient time and at a sufficient temperature to form said ceramic.

37. The ceramic formed by the pyrolysis of the preceramic polymer of claim 1 in an ammonia atmosphere for a sufficient time and at a sufficient temperature to form said ceramic.

38. The ceramic formed by the pyrolysis of the preceramic polymer of claim 5 in an ammonia atmosphere for a sufficient time and at a sufficient temperature to form said ceramic.

39. The ceramic formed by the pyrolysis of the preceramic polymer of claim 16 in an ammonia atmosphere for a sufficient time and at a sufficient temperature to form said ceramic.

40. The ceramic formed by the pyrolysis of the preceramic polymer of claim 22 in an ammonia atmosphere for a sufficient time and at a sufficient temperature to form said ceramic.

* * * * *